INVENTOR.
NICHOLAS PETERS
BY
*F. Lederman*
ATTORNEY

United States Patent Office 3,376,575
Patented Apr. 2, 1968

3,376,575
PLURAL CHANNEL RADIO REMOTE CONTROL SYSTEM RESPONSIVE TO A PIVOTED MEMBER CONTROL AND INCLUDING A CHANNEL FOR TRANSMITTING A SIGNAL WHICH COMPENSATES FOR LAG OF THE CONTROLLED DEVICE BEHIND THE CONTROL
Nicholas Peters, 15 Lorelei Drive,
Yorktown Heights, N.Y. 10598
Filed Aug. 22, 1963, Ser. No. 303,758
7 Claims. (Cl. 343—225)

ABSTRACT OF THE DISCLOSURE

A plural channel radio remote control system wherein movement of a control stick means from a neutral position operates to cause a transmission of signals representative of the desired direction over one or more channels to a remote vehicle operator means. A follow up motor is also energized to return the control stick means to a neutral position. Upon return to the neutral position, an additional channel is energized to maintain the operation of the remote vehicle operator means for a predetermined period of time to compensate for lag in the remote vehicle means.

---

This invention relates to remote radio control systems, and is applicable for use in conjunction with any device where a remote control system is desired. Examples of such devices include airplanes, railroad trains, missiles, boats, ships, submarines and torpedos, that is, devices, vehicles or the like where a control system is desired to control the movement of one or more movable parts in proportion to the movement of the control unit by the remote operator.

Basically, remotely controlled devices such as exemplified above embody at least one movable member which is adapted to be moved from a normal neutral position through an arc in either direction. For the purpose of clarifying the present invention, and merely by way of example, the controlled device is presented as an airplane.

An object of the invention is the provision, in conjunction with a radio transmitter at the control station and a radio receiver on or associated with the controlled device, of a unit including a control motor at the control station and a unit including a servo motor at the controlled device, together with switch means actuated by the operator as through a control stick and corresponding switch means associated with the servo motor, whereby the control motor remains energized for a period of time proportional to the distance the stick has been moved from neutral position and the servo motor is likewise energized for the same period of time. With the servo motor geared to, for example, the rudder or elevator of an airplane, the controlled member will be turned by the servo motor from neutral position through the same period of time and through an arc proportionate to the arc through which the control stick has been moved. To thus turn the controlled member in one direction the transmitter will send out a signal at a given frequency, and to turn it in the opposite direction the transmitter will send out a different frequency. The term "frequency" is herein used merely to signify that the radio signals in each case of sending an order to the receiver are distinguishable from each other by the receiver, as such signals may differ from each other in ways other than frequency, so long as the receiver is capable of responding selectively to the different signals. Numerous different forms of such signals are well known in the art.

A further object of the invention is the provision of a control unit having additional means operable when the control stick has been returned to neutral position for continuing transmission on a new frequency for a limited time such as, for example, two seconds, so that in case the controlled unit should lag behind the control stick it will thereby continue to turn through the desired arc, and thus also assures synchronization of the controlled unit with the control stick for the next command to be given.

Another object of the invention is the provision of a unit at the control station, which includes two separate motors actuatable either selectively or simultaneously and in relatively varying degrees by a single control stick, and two units, each having a servo motor, at the controlled units, for selective or simultaneous operation of two controlled members, as, for example, the rudder and the elevator of an airplane.

Still another object of the invention is the provision of means at the controlled unit to prevent the servo motor from turning the controlled member, such as, for example, the plane's rudder, beyond its limit of travel, in case this motor is ahead of the control stick, that is, when the control stick is at its limit of travel in one direction.

Yet another object is the provision of novel and improved reversible DC motors as part of the present invention.

The above as well as additional objects will become apparent in the following description wherein reference numerals refer to like-numbered parts in the accompanying drawings. It is to be noted that the drawings are intended primarily for the purpose of illustration and that it is therefore neither desired nor intended to limit the invention necessarily to any or all of the details shown or described except insofar as they may be deemed essential to the invention.

Referring briefly to the drawings.

Referring in detail to the drawings, and first to the control unit of FIGS. 3–7, the numeral 20 indicates the unit frame which is shown to include a base 21, upright corner supports or posts 22, 22a, 22b and 22c, and a top 23. A circularly arcuate guide 24 is pivotally suspended by its opposed vertical extremities 25 in downward projections 26 on opposite sides of the top 23 and is provided with a median longitudinal slot 27. A second similar guide member 28 identical to the member 24 but of larger radius of curvature, is similarly suspended below the member 24 in projections 26a on the other two opposite sides of the top 23, and is also provided with a longitudinal median slot 29; both slots 27 and 29 lie in the planes of the respective members. A platform 30 is hung from the top 23 by pins or the like 31 and has a circular opening 32 therethrough.

Figure 3:
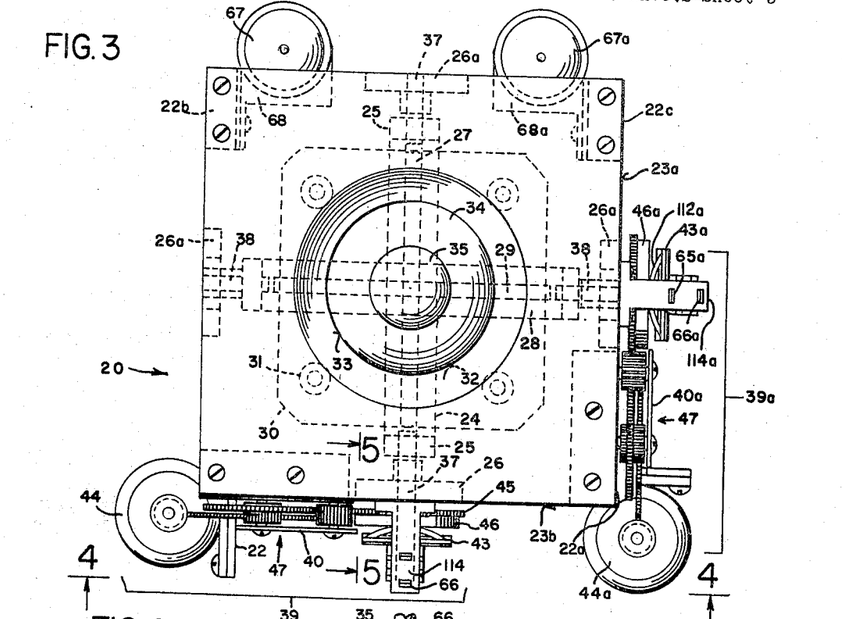
FIG. 3 is a top plan view of the manually operated control unit.
Figure 4:
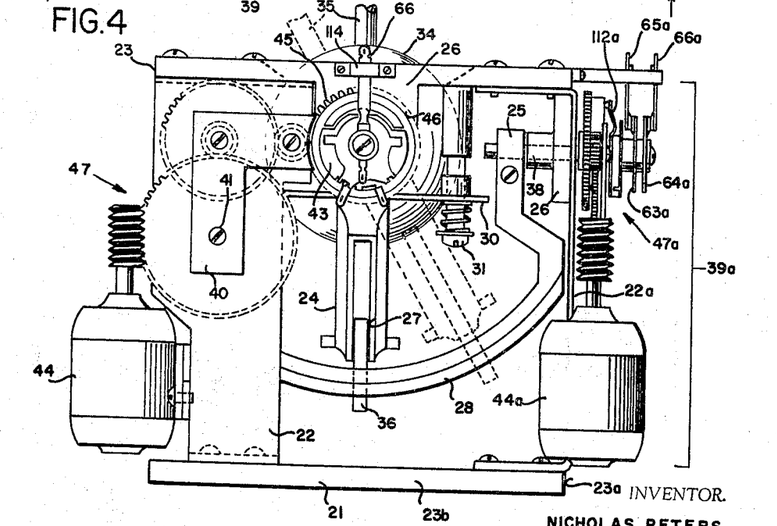
FIG. 4 is a side elevational view of the control unit as seen along the arrows 4—4 of FIG. 3.
Figure 5:
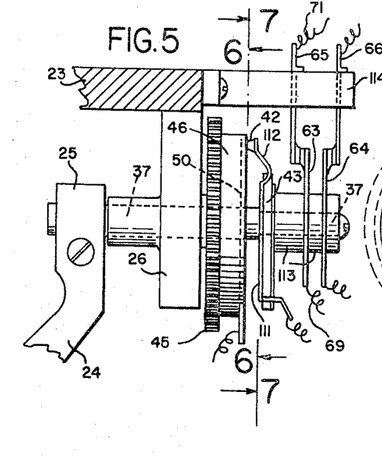
FIG. 5 is an enlarged sectional view taken on the line 5—5 of FIG. 3.

The top 23 has a similar opening 33 therein aligned with the opening 32. A ball 34 is universally rotatably contained between the openings 32 and 33. A control stick 35 extends upward from the ball and a pin 36 extends downward therefrom, both the stick and the pin being in alignment along a diameter of the ball. The pin 36 registers slidably in both slots 27 and 29 of the guides 24 and 28, respectively.

The pivoting of the guide 24 is provided by means of aligned studs 37 rigid with the guide and rotatable in the opposed projections 26; likewise the pivoting of the guide 28 is provided by aligned studs 38 rigid therewith and rotatable in the opposed projections 26a. The aligned axes of the studs 37 are at right angles to the aligned axes of the studs 38. Assuming for the sake of orientation that the arrow to the right of FIG. 4 points to the east, as the stick is swung toward the east the guide 24 will swing toward the west, and vice versa. Also, as the stick is swung toward the north, the guide 28 will swing toward the south, and vice versa. Movement of the stick in any direction other than north-south, or east-west will cause a combined simultaneous movement of both guides at varying degrees of swing.

Mounted on two adjacent sides 23a and 23b of the frame 20, are two identical assemblies 39 and 39a, the former shown supported on a post 22 and the latter shown supported on the post 22a, similar to the post 22. Since the assemblies 39 and 39a are identical to each other, only the assembly 39 will now be described in detail. The stud 37 on the side 23b is elongated beyond the adjacent edge of the top 23, as is also the stud 38 beyond its adjacent edge 23a.

An inverted L-shaped bracket 40 is secured by spaced pins 41 outward from the post 22. On this elongated stud a disc 43 of insulating material is fixed and has mounted on the back thereof a metallic plate or the like 111 from which a resilient extension 112 projects beyond the edge of the disc and inward toward the left, FIGS. 3 and 5 and has a nose 42 thereon. A motor 44 is shown mounted on the post 22 and a gear 45 is rotatably mounted on the said elongated stud 37. Fixed to the gear is a second disc 46 of insulating material of larger diameter than the disc 43. A speed reducing train, indicated generally at 47, is shown to include a worm, gears and pinions, some of whose members are rotatably mounted on the pins 41. Any speed reducing means having the desired reduction ratio may of course be substituted for that shown at 47.

Figure 6:
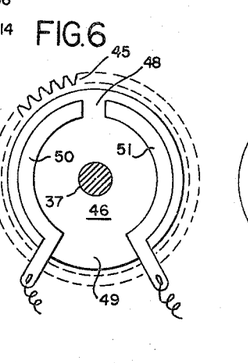
FIG. 6 is a sectional view taken on the line 6—6 of FIG. 5.

FIG. 6 shows the side of the disc 46 which faces the disc 43. It is to be noted that in FIGS. 3–7 the various elements are shown in their neutral position, that is, for example, the positions they occupy when the stick 35 extends vertically upward from the top 23 of the frame 20. The said side of the disc 46 is provided with two opposed circularly arcuate metallic segments or rails 50 and 51 concentric with the stud 37. The upper ends, FIG. 6, of these rails have a relatively narrow space 48 therebetween, whereas their lower ends have a wider space 49 therebetween. The rails are preferably flush with the surface of the disc 46, as shown. The nose 42 is at the same radial distance from the axis of the stud 37 as the rails 50 and 51, and it is normally urged against the disc 46. Thus, as the disc 43 turns clockwise, FIG. 7, it is obvious that the nose 42 will ride over the right-hand rail 51, FIG. 6, and vice versa. The motor 44, like the other motors discussed herein, is a permanent magnet DC motor whose direction of rotation is reversed upon reversal of the direction of the current through its terminals to ground, both the armature windings and the armature being grounded, as will be described in detail below.

Figure 1:
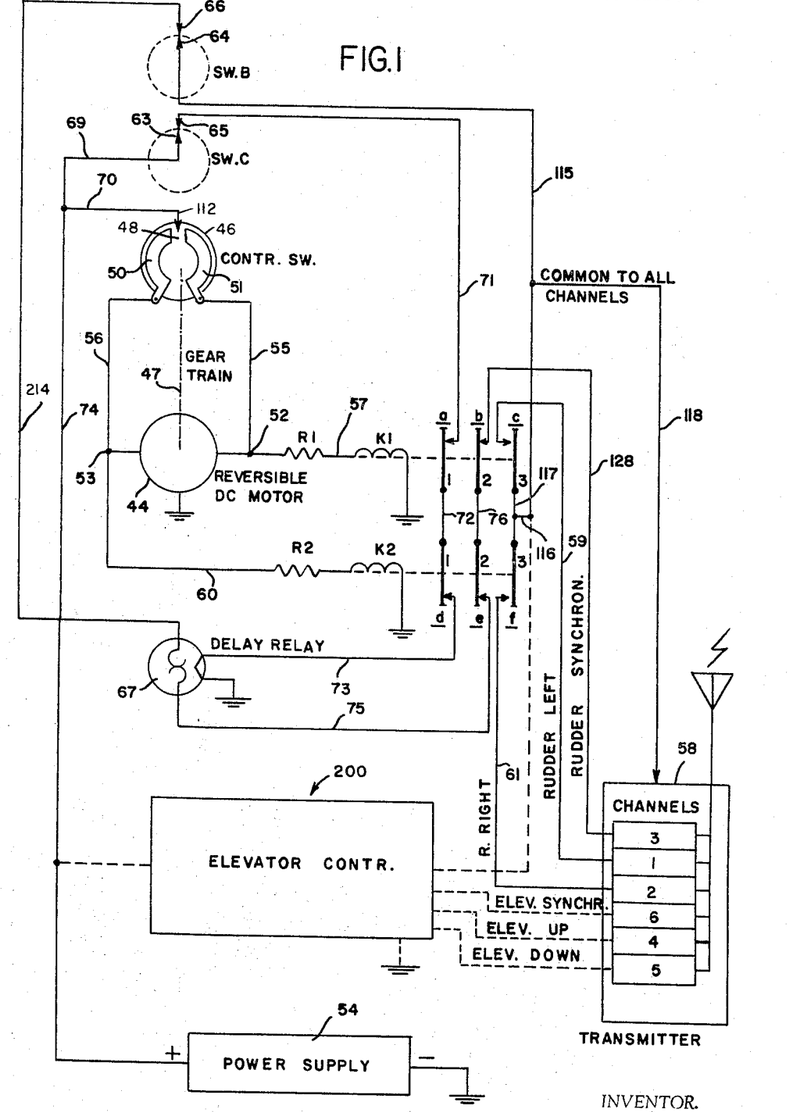
FIG. 1 is a circuit diagram of the command or sending station including the control unit and the associated circuit elements and the transmitter.

In the circuit diagram, FIG. 1, the two terminals of the motor are indicated at 52 and 53, and the plus side of the power supply 54 leads to the contact finger 112 through leads 74, 70. As the disc 43 is turned clockwise, the finger 112 contacts the rail 51 and sends current through the terminal 52 via lead 55 and through the grounded armature of the motor, to ground. Thus the motor will start rotation in a direction to rotate, through the gear train 47, the disc 46 clockwise until the blank space 48 arrives at the new position of the finger 112 when the circuit through the motor will be broken. Thus, the farther from neutral that the disc 43 and contact finger 112 is turned by the control stick, the longer will the motor be energized and the farther it will turn the disc 46. When the disc 43 is then turned counter-clockwise the finger 112 will contact the rail 50 to send current through the motor via lead 56 to motor terminal 53 and to ground, to turn the motor in the opposite direction and again to turn the disc 46 in the opposite direction until the neutral position of the finger 112 in the space 48 is again reached.

A lead 57 from the terminal 52 connects a relay K1 to ground. This relay has contacts a, b and c; contacts a and b are normally closed and contact c is normally open. A radio transmitter is shown at 58 having six sending channels of different frequencies. Transmitter 58 is supplied with power from a conventional source, not shown. Contact c is connected by lead 59 to transmitter channel #1, which is labeled "Turn Rudder Left." It is now apparent that when the disc 43 carrying contact finger 112 is turned clockwise, closing the motor circuit through terminal 52, relay K1 will be energized to close contact c, thus causing the transmitter to send out a signal on channel #1 and to continue to send out that frequency until the disc 46 has rotated through the same arc as the finger 112, as described above. When the disc 43 and finger 112 are rotated counter-clockwise, relay K2 will be energized through lead 60 from motor terminal 53 to ground; this relay has normally closed contacts d, e and normally open contact f. Lead 61 connects contact f to channel #2 of the transmitter, which is marked "Turn Rudder Right." Thus the transmitter will send out the frequency of channel #2 and continue to do so until the motor, now in the reverse direction, will have rotated the disc 46 back to bring the space 48 again into the position of the contact finger 112. The functions of relays K1 and K2 may be provided by transistors if desired.

Two spaced normally upright contact fingers 63 and 64, FIGS. 1, 4, and 5, are fixed, with intervening insulating spacers 113, on the outer portion of the elongated stud 37. An extension or attachment 114 of insulating material secured to the top 23 supports contact members 65 and 66, complementary, respectively, with fingers 63 and 64, whence 63–65 and 64–66 constitute two switches which are normally closed, that is, they are closed when the fingers 63 and 64 are upright. A time delay relay 67 is shown (FIG. 3) mounted on a support 68 attached to the corner post 22b; in the embodiment herewith presented this is a two-second delay relay in the form of a vacuum tube type 6C27.

Referring again to the circuit diagram of FIG. 1, it will be noted that when the control stick is in neutral position, i.e., when the disc 46 is positioned with the space 48 occupied by the finger 112, the switches 63–65 and 64–66 are closed.

FIG. 1 shows leads 69 and 70 connecting contact finger 63 with finger 112. A lead 71 connects contact 65 with the nomally closed contact *a* of relay K1 and, through common lead 72 between contact *a* and the likewise normally closed relay contact *d* and through lead 73 to the filament of delay relay 67, to ground. Lead 214 connects contact 66 to one relay contact of tube 67. Lead 75 connects the other relay contact of tube 67 with the normally closed contact *e* of relay K2 and, through the lead 76, with the normally closed contact *b* of relay K1. Lead 115 connects finger 64, through lead 116 and common 117, to relay contacts *c* and *f*, and lead 118, common to all channels of the transmitter, is connected to lead 115.

It is now clear that whenever the control stick has been returned to neutral position after having turned the rudder either to left or right, the switches 63–65 and 64–66 will be closed. Switch 64–66 contemplates a circuit to the channel 3 input of the transmitter via leads 118 and 128. Since contacts *a* and *d* of relays K1 and K2, respectively, are now also closed, delay relay 67 will be energized and, since its two relay contacts are in mutual engagement, the transmitter will send out the frequency of channel #3 for two seconds, by energization of the circuit through lead 75, contact *e* of relay K2 and contact *b* of relay K1, and lead 128. The latter lead controls the "Rudder Synchronizer" frequency and, as will be described below, this signal is picked up in channel #3 of the receiver. This permits the receiver servo motor to continue to operate for the length of time necessary to overcome a possible lag between the motor 44 and the servo motor controlling the movement of the rudder on the airplane. However, as will also be explained below, if the servo motor attains synchronization with the motor 44 before the lapse of two seconds, the servo motor circuit will be opened at the instant of synchronization.

FIGS. 8–11 illustrate the controlled unit on the airplane, shown supported on a frame which is shown open at the front and sides which includes a base 78, a wall 79 and an overhang or roof 80. A reversible DC motor 81, similar to the motor 44, is shown mounted on the wall 79. A two-armed crank 82 is shown pivotally mounted on the roof, from which lead cables 83 and 84 which, for the present, will be assumed to be attached to an airplane rudder on opposite sides of its pivot axis. A speed reducing gear train 47b, having the same speed reduction ratio as the gear train 47, connects the motor shaft with the shaft 85 to which the crank 82 is secured. The train 47b includes the gear 86 which is rigid with the pivot shaft 85 and which is identical to the gear 45. The disc 87 is identical to the disc 46 of FIG. 6 and is fixed to the shaft 85; it has on its underside two opposed arcuate segments or rails 50b and 51b identical to the rails 50 and 51, concentric with the shaft 85 and provided with a space 48b, similar to the space 48, therebetween. A shaft 88 has a gear 120 thereon identical to the gear 86, which is driven through a pinion 121 at the same speed as the shaft 85.

Figure 10:
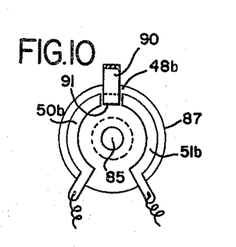
FIG. 10 is a sectional view taken on the line 10—10 of FIG. 8.
Figure 11:
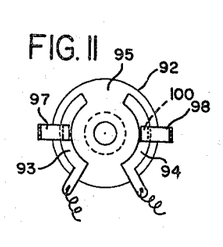
FIG. 11 is a sectional view taken on the line 11—11 of FIG. 8.

Shown supported on a bracket 89 secured to the wall 79, is a spring contact finger 90 provided with a nose 91 similar to the nose 42, urged into engagement with the disc 87 at the same radial distance from the shaft 85 as the rails 50b and 51b. A disc 92 of insulating material and of the same diameter as the discs 46 and 87, has on the underside thereof two concentric arcuate rails 93 and 94, and it is fixed on the shaft 88. These rails have a relatively larger space 95 between the juxtaposed ends thereof. Secured on a bracket 96 attached to the wall 79 are two diametrically opposed spring fingers 97 and 98 provided with noses 100 which are urged into contact with the rails 93 and 94, respectively, and which in the neutral position of the disc 87, shown in the FIG. 10, are positioned substantially intermediate the lengths of the rails as shown in FIG. 11.

Figure 2:
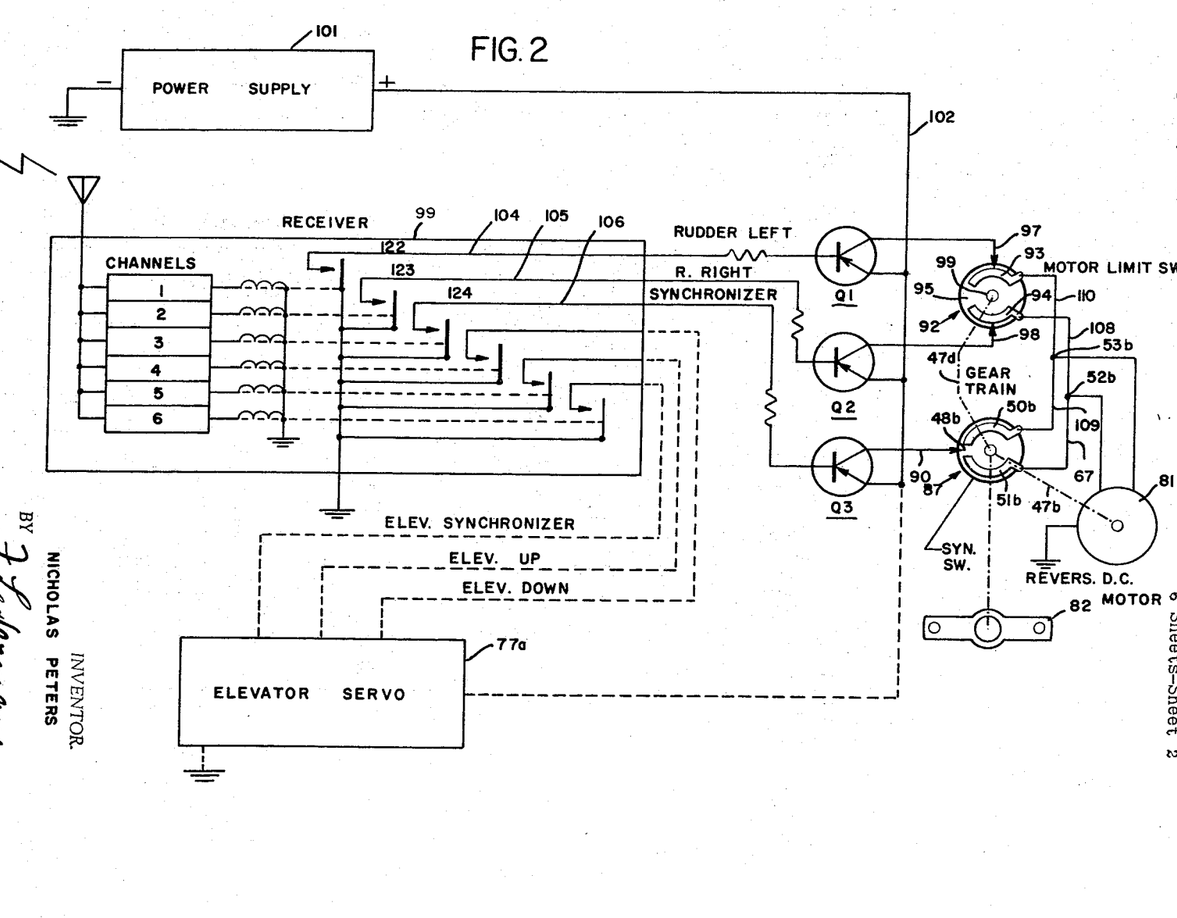
FIG. 2 is a circuit diagram of the receiving station including the controlled unit and the associated circuit elements and the radio receiver.

Referring now to the receiver circuit diagram of FIG. 2, a radio receiver shown at 99 is equipped to receive selectively the various signal frequencies emitted by the transmitter 58, in the well known manner, and with relays 122, 123 and 124 adapted to be selectively energized to close circuits of the various channels therethrough. A grounded power supply 101 has its plus side connected, through the media of transistors, Q1 and Q2, to the fingers 97, 98 engaging the rails 93, 94 of disc 92, and through the transistor Q3 to the finger 90 engaging the disc 87. Leads 104, 105 and 106 connect receiver channels #1, #2, and #3, respectively, also to the three transistors. The transistors are connected in circuit in the standard maner solely for the purpose of lowering the current flow at the contacts of the relays or reeds of the receiver to avoid arcing and consequent damage to the contacts.

The terminal 52b of the servo motor 81 is connected through lead 67 to the rail 51b of disc 87 and through lead 108 to the rail 94 to disc 92. Terminal 53b connects through lead 109 with the rail 50b of disc 87 and through lead 110 with the rail 93 of disc 92.

When the control stick 35 has been turned to send out a "Turn Rudder Right" signal on channel #2, the receiver relay 123 for channel #2 will be closed through lead 105, whence current will flow from the power supply 101 through transistor Q2, finger 98, rail 94, lead 108 and motor terminal 52b to ground, to turn the motor 81 in the same direction and through the same number of rotations, as the motor 44. Through the gear train 47b, the disc 87 will likewise turn, for example, clockwise, FIG. 2, thus engaging finger 90 with rail 51b to the same arcuate extent as the finger 112 of disc 43 has engaged rail 51 of disc 46, FIG. 1. When now channel #1 frequency is sent out to "Turn Rudder Left" by turning the stick 35 back toward neutral position, the contact of relay 122 will be closed to connect transistor Q1 through lead 104, and current will pass from power supply 101 through transistor Q1 to the other terminal 53b of motor 81 to reverse its direction, since current will now pass through finger 97, rail 93 and lead 110. Thus motor 81 will run until nose 91 of finger 90 is brought back into the neutral position, in the space 48b, FIG. 2.

The motor 81 is liable, after a number of commanded operations, to lag behind motor 44 so that when the control stick has been returned to neutral position the rudder will not have completed the arcuate movement last commanded, so that the finger 90 of disc 87, instead of having reached the neutral position of space 48b, will remain in contact with rail 51b. As described above, upon return of the stick 35 to neutral position the transmitter will send out the signal of channel #3, which is picked up in receiver channel #3 to close the contacts of relay 124 and through lead 106 to transistor Q3, whence current is delivered to motor 81 to rotate the motor farther in the same direction in which it was last turning. This circuit will remain energized up to a maximum of two seconds which, as an example, should be sufficient for the disc 87 to continue rotation until finger 90 reaches the neutral space 48b.

Actually, however, this position should be reached in less than that time, and the instant it is reached the motor 81 becomes deenergized and stops. Thus each time the control stick is in neutral position, as for straight ahead flight of the plane, the servo motor 81 is brought into synchronization with the control motor 44.

It is of course obvious that when the control stick has been moved from a position in which it had been before being moved through neutral in the opposite direction, the motor 81 will operate continuously to turn the disc 87 through neutral through the same arc as the stick moved through.

The disc 92 together with its contact rails 93, 94 and the contact fingers 97, 98 constitutes what may be termed a "Servo Motor Limiter" switch and is so labeled in FIG. 2; it serves to prevent the servo motor 81 from turning the rudder, i.e., the crank 82, beyond the permissible limit of turn or length of arc of the rudder. Thus, if the motor 81 should be ahead of the motor 44, which is a condition that may also occur, that is, the desired turn of the rudder through which the stick 35 has been moved in either direction, the disc 92 will be moved into a position where either finger 97 or 98, depending upon the direction of rotation of the disc, moves into the blank space 95, FIGS. 2 and 11. When this occurs the circuit to the motor 81 is opened through one of the two terminals 52b, 53b to prevent overtravel of the rudder. The finger 97 or 98 is again brought back into contact with the associated control rail 93 or 94 when the control stick is reversed, causing reversal of the rotation of the motor 81. Any desynchronization caused by the limiting operation is later compensated by the operation of the synchronization disc 87 as previously described.

Regarding the delay relay tube 67, the current flowing through the filament thereof from lead 73, FIG. 1, to ground heats the filament and after two seconds this heat causes the relay contacts to separate to open the circuit through the contacts.

The disc 46 together with its rails 50 and 51 and the finger 112 which moves with the control stick, constitute a "Control Switch" and is so labeled in FIG. 1. The disc 87 together with its rails 50b and 51b and the finger 90, constitute a "Servo Motor Synchronizer Switch" which is so labeled in FIG. 2.

Figure 7:
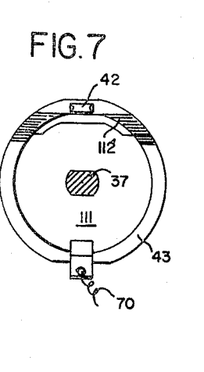
FIG. 7 is a sectional view taken on the line 7—7 of FIG. 5.

Reference is now made to the assembly 39a, FIGS. 3 and 4, on the side 23a of the frame 20 of the control unit. This assembly is, in all respects, a duplication of the assembly 39, as stated above. The stud 38 at this side of the frame is elongated identically to the stud 37 in the assembly 39, and parts of the assembly 39a which are identical to the assembly 39 bear, in FIGS. 3 and 4, identical reference numerals followed by the suffix "a." Since the detail views in FIGS. 5, 6 and 7 are exactly the same for the assembly 39a as for the assembly 39, such views have not been repeated in the drawing. Also provided for the assembly 39a is a second time delay relay tube 67a, identical to the tube 67.

The operation of the control system has been described above only in relation to swinging the control stick on the axis of the studs 37 to control the movement of an airplane rudder. It is apparent that movement of the control stick on the axis of the studs 38 can be utilized, through the medium of the assembly 39a and circuits similar to those described in reference to FIGS. 1 and 2 to control the movement of another element of the plane, such as, for example, the elevator, in conjunction with a second controlled unit on the plane identical to that shown in FIGS. 8, 9, 10 and 11. To indicate this diagramatically in FIGS. 1 and 2, block 200, FIG. 1, is shown with the legend "Elevator Control Circuit Same As Rudder Control," with interrupted or broken lines including those with additional legends leading from additional relays in the receiver which are actuated selectively by signals received in channels #4, #5 and #6. This schematic indication of the ability of the single control unit 20 to control both the rudder and the elevator of a plane is believed sufficient to one skilled in the art to enable him to construct such a system from the disclosure.

Figure 8:
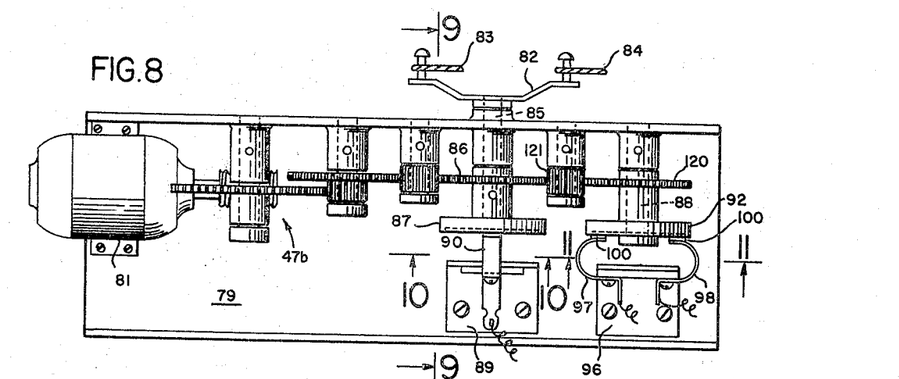
FIG. 8 is a front elevational view of a controlled unit.
Figure 9:
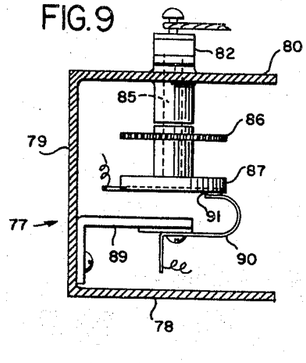
FIG. 9 is a sectional view taken on the line 9—9 of FIG. 8.

With the single control unit provided with both assemblies 39 and 39a thus connected in circuit with the six sending channels, and the receiver provided with six equivalent receiving channels, and with two separate controlled units like that shown in FIG. 8, one for the rudder and the other for the elevator, it is obvious that any movement of the control stick in other than a vertical plane, will bring about a simultaneous sending out of signals in either of channels #1 and #2 and either of channels #4 and #5, with a corresponding simultaneous responsive action of both the rudder and the elevator.

The voltages of the power supplies as well as those delivered to or by the transistors, in fact all voltages involved are a matter of choice well within the capabilities of those skilled in the art, to achieve the desired results. The instant remote control system may of course be applied to control the movement of any other one or two movable members besides the rudder and elevator of an airplane, and the system may be applied to control movable parts or members of any other vehicle or device where such control is desirable.

FIGS. 12–15 illustrate schematically one type of reversible permanent magnet DC motor 44, 44a abd 81, which is provided with two terminals and a grounded armature frame. To tie this motor in with the previous description, the arrows in FIGS. 13–15 which represent the commutator brushes, are indicated by the numerals 52 and 53, to show that the motor terminals 52 and 53 of motor 44 lead, respectively, to these brushes. This type of motor may be termed a "split wound armature" motor, which, when unidirectional current is sent through one brush or terminal 52 to ground, rotates in one direction and when the current is sent through the brush or terminal 53 to ground rotates in the opposite direction.

Figure 12:
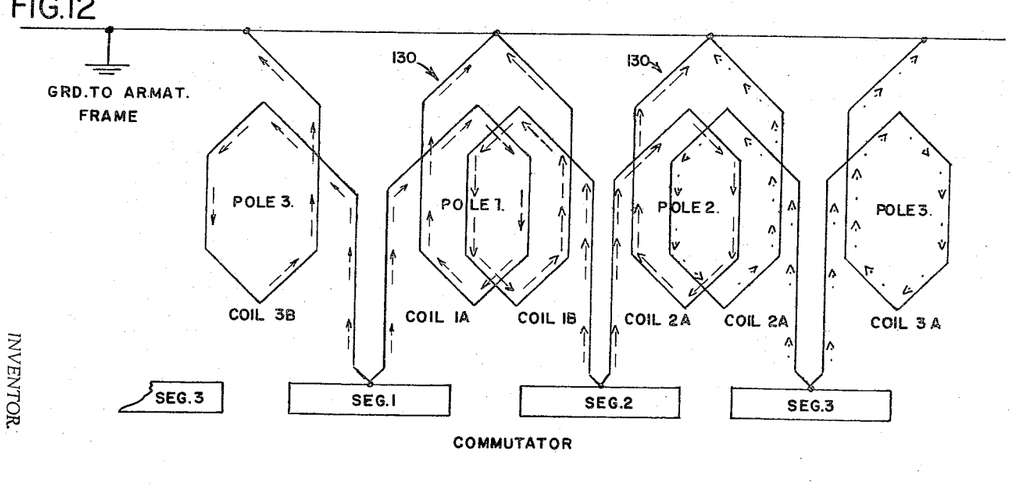
FIG. 12 is a schematic diagram of the armature winding of one form of reversible permanent magnet DC motor forming part of the instant system.

The armature winding diagram of FIG. 12 shows that each of the three poles of the armature, designates poles #1, #2 and #3, has a continuous two-turn coil 130 wound thereon, and that each such coil has its midpoint grounded to the armature frame thus dividing or "splitting" it into two separate coils of equal length extending from the grounded point in mutually opposite directions. Thus pole #1 has oppositely wound coils 1A and 1B, pole #2 has similar coils 2A and 2B, and pole #3 has similar coils 3A and 3B. The ends of the coils 130 are connected to successively adjacent commutator segments of which, of course, there are three, whence coil 1A is connected to commutator segment #2, coil 1B is connected to segment #2, coil 2A is connected to segment #2, coil 2B is connected to segment #3, coil 3A is connected to segment #3, and coil 3B is connected to segment #1. In practice, of course, a predetermined number of turns in the split coils 130 are used on each armature pole; for example, in one case such coils have fifty-five turns. The two brushes #1 and #2 in FIGS. 13–15 lie in a common plane through the median lines of the north (N) and south (S) pole of the permanent magnet.

Figure 13:
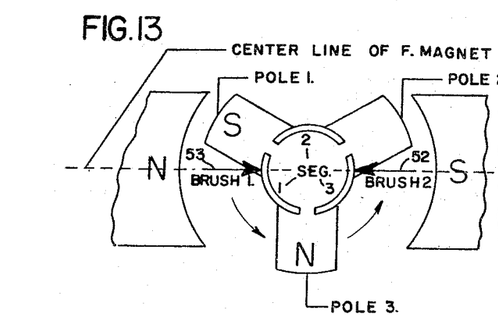
FIGS. 13, 14 and 15 are schematic views illustrating the operation of the said motor.
Figure 14:
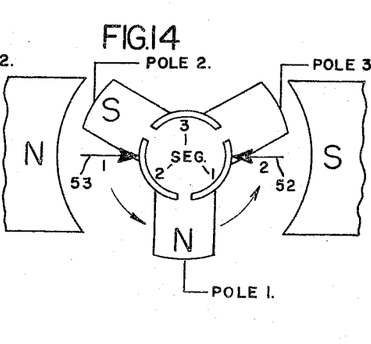

When positive voltage is applied to brush #1, FIG. 13, which is making contact with commutator segment #1 (brush #2 being inactive), current flow is through coil 3B of pole #3 and through coil 1A of pole #1 as indicated by solid arrows in FIG. 12. This flow at coil 3B creates a north magnetic field at pole #3, and the flow in coil 1A creates a south magnetic field at pole #1, whence, FIG. 13, pole #1 is attracted to the north magnet pole and pole #3 is attracted to the south magnet pole, to turn the armature counter-clockwise, FIG. 13. As the armature continues to turn in this direction, commutator segment #1 passes from under brush #1, and segment #2 now makes contact with brush #1, FIG. 14. Now the current flow is through coil 1B and coil 2A as indicated by broken arrows, FIG. 12, thus creating a south magnetic field at pole #2 and a north field at pole #1, hence continuing counter-clockwise rotation, FIG. 14, and so on.

Figure 15:
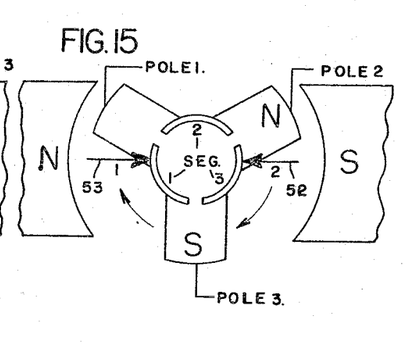

To reverse the direction of rotation of the armature, the positive of the power supply is directed to brush #2 so that brush #1 is now inactive, FIG. 15. Current flow now is from commutator segment #3, through coils 3A and 2B, indicated by dotted arrows, FIG. 12. This creates a north magnetic field at pole #2 and a south field at pole #3, turning the armature clockwise, and so on.

An added feature of the split wound armature motor is that when one brush has a positive voltage applied thereto to turn the motor in one direction, the other inactive brush may be used to tap current from the armature through ground, as the armature would serve as a generator through the inactive brush. Hence when such motor is used in servo mechanisms it could generate voltage and through a feed back system the generated current could be used to damp the motor.

Figure 16:
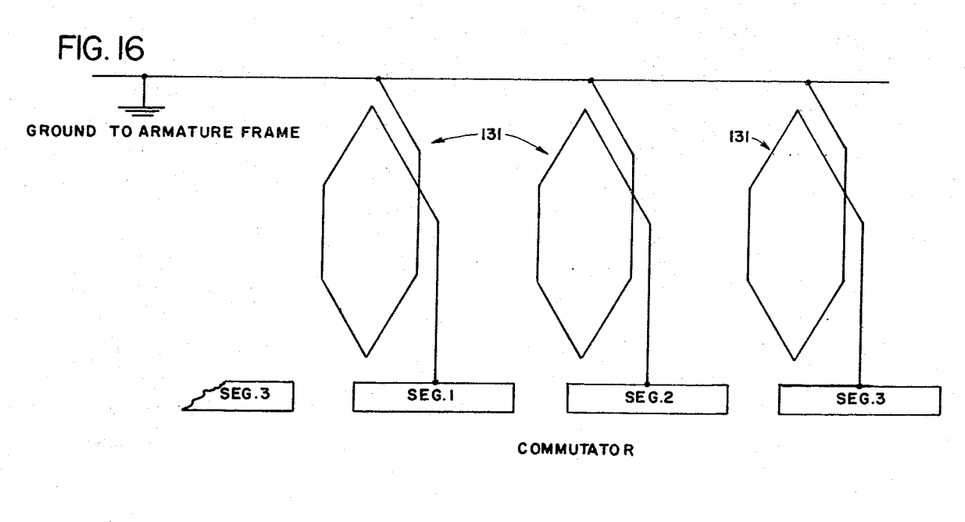
FIG. 16 is a schematic diagram of the armature winding of another form of such a motor for the system.
Figure 17:
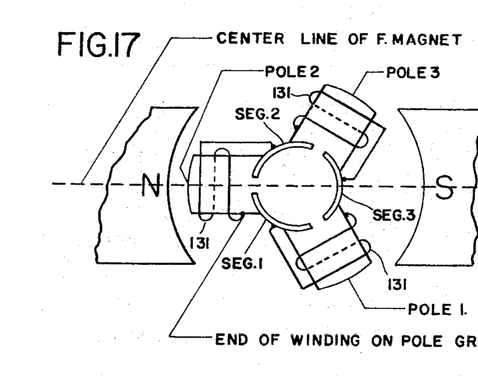
FIGS. 17, 18 and 19 are schematic views illustrating the operation of the other form of the motor.

A modified type of permanent magnet DC motor whose direction of rotation is reversed by sending unidirectional current through one terminal or the other to ground, is illustrated in FIGS. 16–19. FIG. 16 is an armature winding diagram of this type, wherein the three identical coils 131 are wound about the three armature poles #1A, #2a and #3A in the same electrical direction, each coil having one end grounded to the armature frame and the other end connected to one of the three commutator segments #1, #2 and #3, in the manner shown. In FIG. 17 the manner of showing the winding of the coils on the armature poles is intended solely for the purpose of indicating that the coils are all wound in the same electrical direction.

A feature of this modified type of motor is a low current drain per running volt, as it has only one active armature pole except for an instant when two commutator segments are making contact with a brush while one is just passing from under the brush. However, this motor supplies only one-half the torque delivered by the split wound armature motor.

Figure 18:
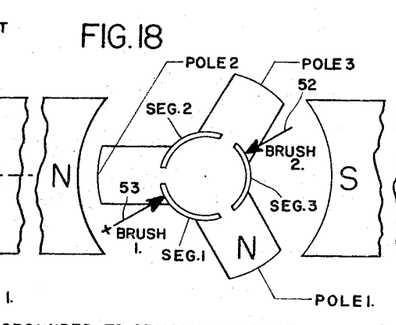
Figure 19:
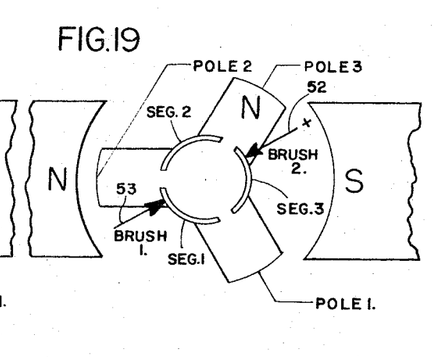

FIGS. 18 and 19 show that the two brushes of this modified motor are offset from the center line of the field magnets by an angle, substantially fifteen degrees, so that the armature will not lock in position. For example, FIG. 18, the two brushes would, if in the plane of the said center line, cause pole #2 to lock, when aligned with the center line of the north field magnet, to the north field magnet if brush #1 were also on the same center line.

As shown in FIG. 18, assuming a positive voltage applied to brush #1 which makes contact with commutator segment #1, a north magnetic field is created in pole #1, attracting it to the south field magnet, thus turning the armature counter-clockwise. In FIG. 19 it is assumed that the voltage is applied to brush #2, whence the armature rotates clockwise. With brush #2 contacting segment #3 a north field is produced in pole #3, attracting the pole to the south field magnet. In both FIGS. 18 and 19 a constant direction of rotation continues with each successive pole as the armature turns.

It is to be noted that in this modified type of motor the field created by the winding of the armature is always a north field, and that there is no change of direction of the current in the armature as was the case with the split wound armature motor. In the modified type the motor is reversed by the activated pole in its relation to the permanent field magnets, i.e., the permanent magnetic field. For example, in FIG. 18 only pole #1 is activated and is attracted to the south field magnet, while in FIG. 19 only pole #3 is activated and is attracted to the south field magnet.

Either of the two types of reversible DC motor illustrated and described may obviously be used interchangeably in the radio control system disclosed, and both types are adaptable for use in applications other than the instant system.

While the invention has been described with particular reference to the embodiments illustrated in the drawings such is not to be construed as a limitation upon the invention which is best defined in the appended claims.

The invention having thus been described, what is claimed and desired to be secured by Letters Patent is as follows:

1. A radio control system for operation upon a distant device of a pivoted member to turn the member selectively in opposite directions through a maximum given arc from a neutral position, comprising a control unit and a radio transmitter provided with means for selectively sending signals on three different channels, the distant device including said pivoted member and a reversible motor for turning the same, a radio receiver on the distant device provided with means for selectively receiving said channel signals, a pivoted control stick on the control unit movable through a maximum given arc in mutually opposite directions from a neutral position, means on the control unit for actuating the transmitter to send a signal on a first channel upon movement of the stick in one direction to cause the receiver output of the corresponding first channel to energize said motor to turn the pivoted member in one direction through an arc proportional to the arc through which the stick was moved, means on the control unit for actuating the transmitter to send a signal on a second channel upon movement of the stick in the opposite direction to cause the receiver output of the corresponding second channel to energize the motor to turn the pivoted member in the opposite direction proportional to the arc through which the stick was moved in said opposite direction, and additional means on the control unit for actuating the transmitter to send a signal on a third channel when the stick has been returned to neutral position to cause the receiver output of the corresponding third channel to energize the motor for a given maximum brief interval of time to turn the pivoted member in the same direction as it was last being turned, the distant device having normally closed switch means operatively connected with said output channels of the receiver and said motor for energizing the motor to turn in one direction or the other upon actuation of the corresponding receiver channel output, the distant device having additional means for reversing the direction of rotation of the motor upon reversal of the direction of movement of the control stick.

2. A radio control system for operation on a distant device of a pivoted member to turn the member selectively in opposite directions through a maximum distance of a given arc from a given neutral position, comprising a control unit and a radio transmitter provided with means for selectively sending signals on two different channels, the distant device including said pivoted member, a radio receiver provided with means for selectively receiving said signals, a controlled unit including a frame having a shaft mounted thereon and means connecting the shaft with the pivoted member for turning the pivoted member, the control member comprising a frame having a shaft thereon, a control stick secured to the last-named shaft at right angles thereto, for turning the shaft in mutually opposite directions through a maximum given arc from an intermediate position, a first disc of insulating material rotatably mounted on the last-named shaft, a first switch means partly fixed to the last-named shaft and partly on said disc, said switch means having a normally open position wherein the stick is in said intermediate position, the part of the switch means on the disc comprising two concentric metallic segments having a blank space between adjacent ends thereof, the part of the switch means fixed to the shaft comprising a first resilient contact finger concentric with said segments and in contact with the disc, the neutral position of the switch means wherein said finger engages said blank space corresponding to said intermediate position of said stick, a first reversible DC motor, speed reducing means of a given reduction ratio connecting the first motor with the disc, electrical means connecting the motor with said switch means for rotation of the motor in one direction upon engagement of said finger with one of said segments and for rotation of the motor in the opposite direction upon engagement of the finger with the other segment whereby the motor continues to rotate in the selected direction for the interval of time required for the rotating motor to rotate the disc into said neutral position of said switch means, electrical means in circuit with said switch means and the transmitter for actuating the transmitter to send a signal on a first of said channels during the time said finger is in engagement with one of the segments and to send a signal on a second of said channels during the time the finger is in engagement with the other segment, the controlled unit having a second switch means identical to the first-named switch means including a second finger fixed to the shaft thereof and a second disc identical to said first disc rotatable on the shaft and provided with two metallic segments identical to the first-named segments, a second reversible DC motor on the controlled unit identical to said first-named motor having speed reducing means of the same reduction ratio as said first-named reducing means connecting the second motor with the second disc, a third switch means on the controlled unit comprising a third disc of insulating material rotatably mounted on said shaft thereof provided with two opposed concentric metallic segments having a blank space between adjacent ends thereof and geared to said second motor at the same reduction ratio as said second disc and having fixed to the frame thereof two diametrically opposed resilient contact fingers concentric with the last-named segments and normally in contact with the segments, electrical means connecting each of the last-named segments with one of the receiver output channels and electrical means connecting each of the diametrically opposed contact fingers with the second motor for rotation of the motor in one direction during the time the signal is received on one of said two receiver channels and for rotation of the motor in the opposite direction during the time the signal is received on the other of the two channels, the third switch means being opened to stop rotation of the second motor when the third disc has been rotated a distance sufficient to bring the blank space thereof into engagement with one of the diametrically opposed spring fingers.

3. A radio control system according to claim 2, said transmitter being provided with additional means for sending a signal on a third channel and said receiver being provided with means for receiving the third signal, said first shaft having two axially spaced contact fingers fixed thereto lying in a plane through the shaft and through said first contact finger and axially spaced from the first contact finger, the control unit frame having two similarly spaced contacts each lying in the orbit of one of the last-named fingers whereby when the stick is in said intermediate position each of the last-named fingers is in engagement with one of said two spaced contacts, a time delay relay having a base circuit and a circuit through the normally mutually engaged contacts thereof, electrical means connecting one of said axially spaced fingers in circuit with said base circuit for actuating the relay when one of the axially spaced fingers engages said one of the two spaced contacts, and electrical means connecting the circuit through the relay contacts with all of said channels of the transmitter, whereby when the stick is in said intermediate position a signal is sent on said third channel and received by the receiver to energize the second motor for a given maximum period of time to rotate the motor further in the same direction as it was last rotating.

4. A radio control system according to claim 1, said motor having a three-pole grounded armature and having two opposed permanent magnets providing the magnetic field thereof, the armature having three commutator segments and having on each of the poles two windings of an equal number of turns, the two windings having a common junction point and extending in electrically opposite directions from the junction point, the junction point being grounded to the armature, the motor having two opposed brushes lying in the plane of the center line of the permanent magnets, the ends of said windings remote from the junction point being connected to two mutually circumferentially adjacent commutator segments, the motor having two terminals, each brush being connected to one of the terminals, whereby a unidirectional current passing through one terminal to ground causes the armature to rotate in one direction and the current passing through the other terminal to ground cause the armature to rotate in the opposite direction.

5. A radio control system according to claim 1, said motor having a three-pole grounded armature and having two opposed permanent magnets providing the magnetic field thereof, the armature having three commutator segments, each of said poles having a winding thereon, the windings all extending in the same electrical direction, each winding having one end grounded to the armature and the other end connected to the axially adjacent one of the three commutator segments, the motor having two brushes lying in a common plane at a small angle to the center line of the permanent magnets, the motor having two terminals, each brush being connected to one of the terminals whereby a unidirectional current passing through one terminal to ground causes the armature to rotate in one direction and the current passing through the other terminal to ground causes the armature to rotate in the opposite direction.

6. A radio control system for operation on a distant device of a first pivoted member and a second pivoted member to turn each member selectively in opposite directions through a maximum given arc from a neutral position, comprising a control unit and a radio transmitter provided with means for selectively sending signals on five different channels, the distant device including said pivoted members, a first reversible motor for turning the first member and a second reversible motor for turning the second member, a radio receiver provided with means for selectively receiving said channels, the control unit including a frame having a top portion provided with a socket, a control stick provided with a ball registering rotatably in said socket in the manner of a universal joint whereby the stick is universally movable, the stick having a neutral position wherein it extends vertically upward from said top portion, means on the control unit for actuating the transmitter to send a signal on a first channel upon a first movement of the stick in one direction from its neutral position in a plane at right angles to said top portion to cause the receiver output of the corresponding first channel to energize the first motor to turn the first pivoted member in one direction through an arc proportional to the arc of movement of the stick, means on the control unit for actuating the transmitter to send a signal on a second channel to cause the receiver output of the corresponding second channel upon a second movement of the stick in said plane in the opposite direction to energize the first motor to turn through an arc proportional to the arc of movement of the stick, means on the control unit for actuating the transmitter to send out a signal on a third channel to cause the receiver output of the corresponding third channel upon movement of the stick in one direction from the neutral position in a plane at right angles to said first-named plane to energize the second motor to turn the second member in one direction through an arc proportional to the arc of movement of the stick, and means on the control unit for actuating the transmitter to send a signal on a fourth channel to cause the receiver output of the corresponding fourth channel upon movement of the stick in the opposite direction in said last-named plane to energize the second motor to turn the second member in the opposite direction through an arc proportional to the arc of movement of the stick, the distant device having normally closed switch means operatively connected with said output channels of the receiver and said motors for energizing the motors to turn in one direction or the other upon actuation of the corresponding receiver channel output, the distant device having additional switch means for reversing the direction of rotation of the motor upon reversing the direction of movement of the control stick, movement of the stick in any direction outside of said planes resulting in a combination of movements of the two pivoted members, and means on said control unit operable upon return of the stick to neutral position for actuating said transmitter to send a signal on a fifth channel to cause the receiver output to continue to energize a motor for a brief maximum interval of time to turn in the direction in which it was last turning to synchronize the arc through which the member controlled by the motor with the arc through which the stick was moved in returning it to neutral position.

7. A radio control system for operation of a pivoted member upon a distant device to turn the member selectively in opposite directions from a neutral position, comprising a control unit including a radio transmitter provided with means for selectively sending signals on three different channels, said control unit including a control switch having a first control switch element movable in a circular arc with a control device to indicate a desired direction and magnitude of movement of said pivoted member, said control switch including a second arcuately movable control switch element, one of said control switch elements comprising an electrical insulating member having two opposed metallic segments arranged thereon and having a relatively narrow insulated space therebetween, the other of said switch elements comprising a contact finger arranged to contact one of said segments whenever there is a relative rotational displacement between said control switch elements and arranged to contact the insulating space between said segments when there is no relative rotational displacement, said control unit including circuit means operable when said contact finger engages one of said segments to energize said radio transmitter to send a signal on a first channel, said control unit including circuit means operable when said contact finger engages the other one of said segments to energize said radio transmitter to send a signal on a second channel, said control unit including a reversible electric motor mechanically connected for movement of said second control switch element, circuit means connected to actuate said motor upon relative displacement of said switch elements to cause said second switch element to move to follow said first switch element until there is no relative displacement therebetween as signified by the engagement of said switch element contact finger with the narrow insulated space between the segments of said other switch element, the individual periods of operation of said motor determining the individual time intervals of transmission of said signals on said first and second channels, said control unit including a neutral position switch associated with said control device and operable thereby to close an electrical circuit when said control device is in a neutral position, said control unit including a circuit operable by said neutral position switch for operating said radio transmitter to transmit a signal on a third channel for a timed interval, said distant device including a radio receiver and a second reversible motor mechanically connected to rotate said pivoted member, said distant device including circuit means associated with said radio receiver and said second reversible motor to energize said motor in a first direction in response to a radio signal on said first channel and in a second direction in response to a radio signal on said second channel, said distant device including a synchronization switch having a fixed contact element and a rotatable contact element mechanically connected for rotation with said pivoted member, said synchronization switch being operable during receipt of said third channel signal to energize said second motor to rotate said pivoted member to a centered position determined by the postiion of said fixed element of said synchronization switch.

References Cited
UNITED STATES PATENTS

| | | | |
|---|---|---|---|
| 2,393,892 | 1/1946 | De Genahl | 318—16 |
| 2,490,768 | 12/1949 | Althouse et al. | 343—228 |
| 2,977,463 | 3/1961 | Lettine et al. | 343—225 |
| 3,011,107 | 11/1961 | Steeb | 318—16 |
| 3,020,457 | 2/1962 | Kelley | 325—37 |

JOHN W. CALDWELL, *Primary Examiner.*

NEIL C. READ, THOMAS B. HABECKER, *Examiners.*

A. J. KASPER, *Assistant Examiner.*